US008923279B2

(12) United States Patent
Rosenberg et al.

(10) Patent No.: US 8,923,279 B2
(45) Date of Patent: *Dec. 30, 2014

(54) PREVENTION OF VOICE OVER IP SPAM

(75) Inventors: Jonathan David Rosenberg, Freehold, NJ (US); Cullen F. Jennings, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 387 days.

This patent is subject to a terminal disclaimer.

(21) Appl. No.: 13/348,451

(22) Filed: Jan. 11, 2012

(65) Prior Publication Data

US 2012/0106401 A1    May 3, 2012

Related U.S. Application Data

(63) Continuation of application No. 12/370,384, filed on Feb. 12, 2009, now Pat. No. 8,121,114.

(51) Int. Cl.
*H04L 12/66* (2006.01)
*H04L 29/06* (2006.01)

(52) U.S. Cl.
CPC .......... *H04L 65/1079* (2013.01); *H04L 63/0807* (2013.01)
USPC ............................. 370/352; 370/401; 726/10

(58) Field of Classification Search
CPC ............ H04L 65/1079; H04L 63/0807; H04L 65/1056
See application file for complete search history.

(56) References Cited

U.S. PATENT DOCUMENTS

| | | | |
|---|---|---|---|
| 5,590,370 A | 12/1996 | Asthana et al. | 395/800 |
| 5,699,514 A | 12/1997 | Durinovic-Johri et al. | 395/188.01 |
| 6,012,144 A | 1/2000 | Pickett | 713/201 |
| 6,088,683 A | 7/2000 | Jalili | 705/26 |
| 6,295,575 B1 | 9/2001 | Blumenau et al. | 711/5 |
| 6,404,870 B1 | 6/2002 | Kia et al. | 379/144.01 |
| 6,529,501 B1 | 3/2003 | Zhao et al. | 370/353 |
| 6,674,850 B2 | 1/2004 | Vu et al. | 379/220.01 |
| 6,700,964 B2 | 3/2004 | Schmid et al. | 379/189 |
| 6,950,652 B2 | 9/2005 | Janssen et al. | 455/419 |
| 6,961,334 B1 | 11/2005 | Kaczmarczyk | 370/354 |
| 7,016,343 B1 | 3/2006 | Mermel et al. | 370/356 |
| 7,143,052 B2 | 11/2006 | LaSalle et al. | 705/7 |

(Continued)

FOREIGN PATENT DOCUMENTS

| CN | 1965564 | 5/2007 |
|---|---|---|
| CN | 101184014 A | 5/2008 |

(Continued)

OTHER PUBLICATIONS

Office Action, dated Jan. 23, 2012, pp. 1-41, U.S. Appl. No. 12/608,484, U.S. Patent and Trademark Office, Virginia.

(Continued)

*Primary Examiner* — Phirin Sam
(74) *Attorney, Agent, or Firm* — Brinks Gilson & Lione

(57) ABSTRACT

In one embodiment, a system is provided to prevent VoIP spam. The system may store call data that is associated with a call to a phone number made over a Public Switched Telephone Network. Subsequently, the system may accept an Internet Protocol telephony connection in response to verification of a demonstrated knowledge of the call. The demonstrated knowledge of the call may be verified based on the call data.

20 Claims, 3 Drawing Sheets

(56) References Cited

U.S. PATENT DOCUMENTS

| | | | |
|---|---|---|---|
| 7,188,138 B1 | 3/2007 | Schneider | 709/203 |
| 7,190,772 B2 | 3/2007 | Moisey et al. | 379/114.27 |
| 7,218,722 B1 | 5/2007 | Turner et al. | 379/221.02 |
| 7,266,114 B2 | 9/2007 | Furukawa et al. | 370/352 |
| 7,289,493 B1 | 10/2007 | Vera | 370/356 |
| 7,352,856 B2 | 4/2008 | Matsuhashi et al. | 379/387.02 |
| 7,383,572 B2 | 6/2008 | Rolfe | 726/5 |
| 7,394,803 B1 | 7/2008 | Petit-Huguenin et al. | 370/352 |
| 7,457,283 B2 | 11/2008 | Dalton, Jr. et al. | 370/352 |
| 7,570,631 B2 | 8/2009 | Bennett | |
| 7,602,734 B2 | 10/2009 | Tang et al. | 370/254 |
| 7,729,700 B2 | 6/2010 | Alemany et al. | 455/436 |
| 7,822,188 B1 | 10/2010 | Kirchhoff et al. | 379/211.02 |
| 7,852,831 B2 | 12/2010 | Akbar | 370/352 |
| 7,855,982 B2 | 12/2010 | Ramankutty et al. | 370/259 |
| 7,983,243 B2 | 7/2011 | Casey et al. | 370/352 |
| 8,040,875 B2 | 10/2011 | Barclay et al. | 370/352 |
| 8,072,967 B2 | 12/2011 | Rosenberg et al. | |
| 8,121,114 B2 | 2/2012 | Rosenberg et al. | 370/352 |
| 8,199,746 B2 | 6/2012 | Rosenberg et al. | |
| 8,204,047 B2 | 6/2012 | Rosenberg et al. | |
| 8,223,754 B2 | 7/2012 | Rosenberg | |
| 8,223,755 B2 | 7/2012 | Jennings et al. | |
| 8,228,902 B2 | 7/2012 | Mehmood et al. | |
| 8,228,903 B2 | 7/2012 | Rosenberg et al. | |
| 8,228,904 B2 | 7/2012 | Rosenberg et al. | |
| 8,274,968 B2 | 9/2012 | Rosenberg et al. | |
| 2001/0032310 A1 | 10/2001 | Corella | 713/156 |
| 2002/0004900 A1 | 1/2002 | Patel | 713/155 |
| 2003/0053605 A1 | 3/2003 | Cashiola | 379/88.17 |
| 2003/0055898 A1 | 3/2003 | Yeager et al. | 709/205 |
| 2003/0065919 A1* | 4/2003 | Albert et al. | 713/168 |
| 2003/0204741 A1 | 10/2003 | Schoen et al. | |
| 2004/0067761 A1 | 4/2004 | Pyhalammi et al. | 455/466 |
| 2005/0232428 A1 | 10/2005 | Little et al. | 380/277 |
| 2006/0002381 A1* | 1/2006 | Socaciu | 370/352 |
| 2006/0182029 A1 | 8/2006 | Kealy et al. | 370/230 |
| 2006/0216131 A1 | 9/2006 | Jhuang | 411/181 |
| 2006/0294576 A1 | 12/2006 | Cross et al. | 726/1 |
| 2007/0036316 A1* | 2/2007 | Croak et al. | 379/201.11 |
| 2007/0183396 A1 | 8/2007 | Bennett et al. | |
| 2007/0183398 A1 | 8/2007 | Bennett et al. | |
| 2007/0183400 A1 | 8/2007 | Bennett et al. | |
| 2007/0183405 A1 | 8/2007 | Bennett | |
| 2007/0183406 A1 | 8/2007 | Bennett | |
| 2007/0183407 A1 | 8/2007 | Bennett et al. | |
| 2007/0183409 A1 | 8/2007 | Bennet | |
| 2007/0183412 A1 | 8/2007 | Bennett | |
| 2007/0183440 A1 | 8/2007 | Bennet et al. | 370/419 |
| 2007/0201451 A1 | 8/2007 | Bennett | |
| 2007/0201660 A1 | 8/2007 | Lan et al. | 379/201.01 |
| 2007/0201688 A1 | 8/2007 | Bennett | |
| 2007/0248098 A1 | 10/2007 | Chen | 370/395.2 |
| 2007/0297395 A1 | 12/2007 | Chiu | |
| 2008/0052270 A1 | 2/2008 | Karlsson | 707/3 |
| 2008/0119195 A1* | 5/2008 | Hansson et al. | 455/445 |
| 2008/0292077 A1 | 11/2008 | Vinokurov et al. | 379/142.04 |
| 2009/0022149 A1 | 1/2009 | Rosenberg et al. | 370/389 |
| 2009/0022150 A1 | 1/2009 | Rosenberg et al. | 370/389 |
| 2009/0022155 A1 | 1/2009 | Rosenberg et al. | 370/392 |
| 2009/0025075 A1 | 1/2009 | Chow et al. | 726/10 |
| 2009/0100262 A1 | 4/2009 | Yoo | 713/155 |
| 2009/0228705 A1* | 9/2009 | Cho et al. | 713/158 |
| 2009/0323677 A1 | 12/2009 | Mehmood et al. | 370/352 |
| 2010/0002686 A1 | 1/2010 | Rosenberg et al. | 370/352 |
| 2010/0002687 A1 | 1/2010 | Rosenberg et al. | 370/352 |
| 2010/0046507 A1* | 2/2010 | Rosenberg et al. | 370/352 |
| 2010/0082828 A1 | 4/2010 | Jennings et al. | 709/229 |
| 2010/0157853 A1 | 6/2010 | Li et al. | 370/271 |
| 2010/0202438 A1 | 8/2010 | Rosenberg | 370/352 |
| 2010/0202439 A1 | 8/2010 | Rosenberg et al. | 370/352 |
| 2010/0316046 A1* | 12/2010 | Kalmanek et al. | 370/352 |
| 2011/0002330 A1* | 1/2011 | Yurchenko | 370/352 |
| 2012/0243530 A1 | 9/2012 | Rosenberg et al. | |
| 2013/0005316 A1* | 1/2013 | Bienn et al. | 455/417 |
| 2013/0029700 A1* | 1/2013 | Noldus et al. | 455/466 |
| 2013/0125220 A1* | 5/2013 | Heffez | 726/5 |

FOREIGN PATENT DOCUMENTS

| | | |
|---|---|---|
| CN | 101278569 | 10/2008 |
| EP | 1 009 153 A1 | 6/2000 |
| EP | 1 385 323 A1 | 1/2004 |
| EP | 1 555 786 A1 | 7/2005 |
| EP | 1 885 104 A1 | 2/2008 |
| JP | 2004-040541 | 2/2004 |
| JP | 2004-304281 | 10/2004 |
| WO | WO2005/057354 A2 | 6/2005 |
| WO | WO2007/037802 A1 | 4/2007 |
| WO | WO 2009/014974 A1 | 1/2009 |

OTHER PUBLICATIONS

Office Action, dated Jan. 23, 2012, pp. 1-41, U.S. Appl. No. 12/608,545, U.S. Patent and Trademark Office, Virginia.
Office Action, dated Jan. 23, 2012, pp. 1-39, U.S. Appl. No. 12/495,639, U.S. Patent and Trademark Office, Virginia.
Office Action, dated Jan. 25, 2012, pp. 1-48, U.S. Appl. No. 12/495,595, U.S. Patent and Trademark Office, Virginia.
Office Action, dated Jan. 26, 2012, pp. 1-51, U.S. Appl. No. 12/495,615, U.S. Patent and Trademark Office, Virginia.
International Preliminary Report on Patentability and Written Opinion, dated Jan. 12, 2012, pp. 1-8, International Application No. PCT/US2010/037459, International Bureau of WIPO, Switzerland.
Notice of Allowance, dated Feb. 16, 2011, pp. 1-11, U.S. Appl. No. 11/780,928, U.S. Patent and Trademark Office, Virginia.
Notice of Allowance, dated Feb. 22, 2012, pp. 1-11, U.S. Appl. No. 11/780,941, U.S. Patent and Trademark Office, Virginia.
Chinese Office Action issued in Chinese Patent Application No. 201080001899.9, dated Jun. 3, 2013, pp. 1-5; State Intellectual Property Office of the People's Republic of China, Beijing, China.
Office Action, dated Apr. 8, 2013, pp. 1-17, U.S. Appl. No. 13/493,486, U.S. Patent and Trademark Office, Alexandria, Virginia.
Office Action, dated Mar. 5, 2013, pp. 1-11, Chinese Patent Application Serial No. 2010-80001900.8, State Intellectual Property Office, Beijing, China.
Notice of Allowance, dated Mar. 30, 2012, pp. 1-11, U.S. Appl. No. 12/367,930, U.S. Patent and Trademark Office Virginia.
Notice of Allowance, dated Apr. 3, 2012, pp. 1-11, U.S. Appl. No. 12/608,484, U.S. Patent and Trademark Office, Virginia.
Notice of Allowance, dated Apr. 3, 2012, pp. 1-11, U.S. Appl. No. 12/495,615, U.S. Patent and Trademark Office, Virginia.
Notice of Allowance, dated Mar. 29, 2012, pp. 1-11, U.S. Appl. No. 12/608,545, U.S. Patent and Trademark Office, Virginia.
Notice of Allowance, dated Mar. 30, 2012, pp. 1-11, U.S. Appl. No. 12/495,639, U.S. Patent and Trademark Office, Virginia.
Wu, T., The SRP Authentication and Key Exchange System, The Internet Society, dated Sep. 2000.
Rosenberg, J., Jennings, C., The Session Initiation Protocol (SIP) and Spam, The IETF Trust, dated Jan. 2008.
Falstrom, P., "E 164 number and DNS", Request for Comments No. 2916, Network Working Group, Sep. 2000, p. 1-9, Cisco Systems, Inc.
International Search Report dated Dec. 12, 2008, pp. 1-5, International Application No. PCT/US2008/070259, European Patent Office, The Netherlands.
Written Opinion dated Dec. 12, 2008, pp. 1-6, Application No. PCT/US2008/070259, European Patent Office, Germany.
Call detail record, dated May 5, 2009, pp. 1-2, Wikipedia, http://en.wikipedia.org/wiki/Call_detail_record.
Computer telephony integration, dated May 12, 2009, pp. 1-4, Wikipedia, http://en.wikipedia.org/wiki/Computer_telephony_integration.
Provisioning Protocol-Specific Interfaces, dated 2007, pp. 1-2, available at www.cisco.com, Cisco.
Neuman, C., Hartman, S., Raeburn, K., RFC 4120, dated Jul. 2005, pp. 1-139, The Internet Society.

(56) References Cited

OTHER PUBLICATIONS

Understanding DNSBL Filtering, Spamhaus, dated Oct. 25, 2007, pp. 1-3, www.spamhaus.org.
Bryan, D., Matthews, P., Shim, E., Willis, D., Concepts and Terminology for Peer to Peer SIP, dated Jun. 2007, pp. 1-26, IETF.
Freedman, M., Morris, R., Tarzan: A Peer-to-Peer Anonymizing Network Layer, dated 2002, pp. 1-14, ACM, Washington,D.C.
Tor: Overview, dated Mar. 2, 2009, pp. 1-5, The Tor Project, Inc., available at www.torproject.org.
Wang, X., Chen, S., Jajodia, S., Tracking Anonymous Peer-to-Peer VoIP Calls on the Internet, dated 2005, pp. 1-11, ACM, Alexandria, Virginia.
Ramasubramanian, V., Sirer, E., Perils of Transitive Trust in the Domain Name System, dated May 13, 2005, pp. 1-6, Cornell University, available at http://ecommons.library.cornell.edu.
Walsh, K., Sirer, E., Experience with an Object Reputation System for Peer-to-Peer Filesharing, dated 2006, pp. 1-14, USENIX Association.
Office Action, dated May 20, 2010, pp. 1-14, U.S. Appl. No. 11/780,975, U.S. Patent and Trademark Office, Virginia.
International Search Report dated Apr. 5, 2010, pp. 1-3, International Application No. PCT/US2010/022004, European Patent Office, The Netherlands.
Written Opinion dated Apr. 5, 2010, pp. 1-7, Application No. PCT/US2010/022004, European Patent Office, Germany.
Notice of Allowance, dated Sep. 14, 2010, pp. 1-6, U.S. Appl. No. 11/780,975, U.S. Patent and Trademark Office, Virginia.
Office Action dated Oct. 6, 2010, pp. 1-11, U.S. Appl. No. 12/370,384, U.S. Patent and Trademark Office, Virginia.
Office Action, dated Jan. 7, 2011, pp. 1-43, U.S. Appl. No. 12/367,930, U.S. Patent and Trademark Office, Virginia.
Office Action, dated Jan. 12, 2011, pp. 1-44, U.S. Appl. No. 12/495,615, U.S. Patent and Trademark Office, Virginia.
Office Action, dated Jan. 7, 2011, pp. 1-43, U.S. Appl. No. 12/495,595, U.S. Patent and Trademark Office, Virginia.
Office Action, dated Jan. 6, 2011, pp. 1-49, U.S. Appl. No. 11/780,928, U.S. Patent and Trademark Office, Virginia.
Office Action, dated Jan. 6, 2011, pp. 1-43, U.S. Appl. No. 11/780,941, U.S. Patent and Trademark Office, Virgina.
Seedorf, Jan, SIP Security: Status Quo and Future Issues, Dec. 27, 2006, pp. 1-5, 23$^{rd}$ Chaos Communication Congress.
Seedorf, Jan, Using Cryptographically Generated SIP-URIs to Protect the Integrity of Content in P2P-SIP, Jun. 2, 2006, pp. 1-16, Third Annual VoIP Security Workshop, Berlin, Germany.
Niccolini, Saverio, SPIT Prevention: State of the Art and Research Challenges, Jun. 2, 2006, pp. 1-37, Network Laboratories, NEC Europe Ltd., Heidelberg, Germany.
Materna, Bogdan, Threat Mitigation for VoIP, Jun. 2, 2006, pp. 1-12, Third Annual VoIP Security Workshop, VoIPshield Systems, Inc.
Hansen et al., Developing a Legally Compliant Reachability Management System as a Countermeasure Against SPIT, Jun. 2, 2006, pp. 1-19, Third Annual VoIP Security Workshop.
Office Action, dated Jan. 13, 2011, pp. 1-53, U.S. Appl. No. 12/495,639, U.S. Patent and Trademark Office, Virginia.
Office Action, dated Feb. 4, 2011, pp. 1-71, U.S. Appl. No. 12/608,545, U.S. Patent and Trademark Office, Virginia.
Office Action, dated Mar. 8, 2011, pp. 1-34, U.S. Appl. No. 12/370,384, U.S. Patent and Trademark Office, Virginia.
International Search Report, dated Nov. 4, 2010, pp. 1-3, International Application No. PCT/US2010/037459, European Patent Office, The Netherlands.
Written Opinion, dated Nov. 4, 2010, pp. 1-8, International Application No. PCT/US2010/037459, European Patent Office, The Netherlands.
Cao, Feng et al., Providing Response Identity and Authentication in IP Telphony, dated 2006, pp. 1-8, IEEE Computer Society.
Office Action, dated Jan. 20, 2011, pp. 1-56, U.S. Appl. No. 12/608,484, U.S. Patent and Trademark Office, Virginia.
Rosenberg, J. et al., RFC 5039—The Session Initiation Protocol (SIP) and Spam, dated Jan. 2008, pp. 1-27, www.rfc-editor.org/rfc/rfc5039.txt.
Rosenberg, J. et al., The Session Initiation Protocol (SIP) and Spam—draft-rosenberg-sipping-spam-00, dated Jul. 11, 2004, pp. 1-21, IETF, http://tools.ietf.org/html/draft-resenberg-sipping-spam-00.
International Preliminary Report on Patentability, dated Jan. 26, 2010, pp. 1-7, International Application No. PCT/US2008/070259, International Bureau of WIPO, Switzerland.
Lack of Unity Action and Partial International Search, dated Mar. 3, 2011, pp. 1-6. International Application No. PCT/US2010/051820, European Patent Office, The Netherlands.
d'Heureuse, Nico et al., Protecting SIP-based Networks and Services from Unwanted Communications, dated 2008, pp. 1-5, IEEE.
Chiang, Hsia-Ling et al., A Study of Global Numbering Plan With Active Anti-Spit Capability on Voip, dated 2008, pp. 17-22, IEEE.
International Search Report, dated Mar. 18, 2011, International Application No. PCT/US2010/051822, European Patent Office, The Netherlands.
Office Action, dated Jun. 22, 2011, pp. 1-31, U.S. Appl. No. 11/780,941, U.S. Patent and Trademark Office, Virginia.
Office Action, dated Jun. 22, 2011, pp. 1-40, U.S. Appl. No. 11/780,928, U.S. Patent and Trademark Office, Virginia.
Office Action, dated Jun. 24, 2011, pp. 1-34, U.S. Appl. No. 12/608,545, U.S. Patent and Trademark Office, Virginia.
Office Action, dated Jun. 27, 2011, pp. 1-38, U.S. Appl. No. 12/367,930, U.S. Patent and Trademark Office, Virginia.
Office Action, dated Jun. 27, 2011, pp. 1-36, U.S. Appl. No. 12/495,615, U.S. Patent and Trademark Office, Virginia.
Office Action, dated Jun. 27, 2011, pp. 1-40, U.S. Appl. No. 12/495,639, U.S. Patent and Trademark Office, Virginia.
Office Action, dated Jun. 27, 2011, pp. 1-41, U.S. Appl. No. 12/608,484, U.S. Patent and Trademark Office, Virginia.
Office Action, dated Jun. 27, 2011, pp. 1-35, U.S. Appl. No. 12/495,595, U.S. Patent and Trademark Office, Virginia.
International Search Report, dated Jun. 29, 2011, International Application No. PCT/US2010/051820, European Patent Office, The Netherlands.
International Preliminary Report on Patentability, dated Aug. 9, 2011, pp. 1-7, International Application No. PCT/US2010/022004, International Bureau of WIPO, Switzerland.
Notice of Allowance, dated Apr. 7, 2011, pp. 1-17, U.S. Appl. No. 11/780,975, U.S. Patent and Trademark Office, Virginia.
Notice of Allowance, dated Jul. 28, 2011, pp. 1-9, U.S. Appl. No. 11/780,975, U.S. Patent and Trademark Office, Virginia.
Notice of Allowance, dated Aug. 18, 2011, pp. 1-10, U.S. Appl. No. 12/370,384, U.S. Patent and Trademark Office, Virginia.
Office Action, dated Nov. 1, 2011, pp. 1-41, U.S. Appl. No. 11/780,928, U.S. Patent and Trademark Office, Virginia.
Office Action, dated Nov. 3, 2011, pp. 1-41, U.S. Appl. No. 11/780,941, U.S. Patent and Trademark Office, Virginia.
Notice of Allowance, dated Oct. 5, 2011, pp. 1-8, U.S. Appl. No. 12/370,384, U.S. Patent and Trademark Office, Virginia.
European Office Action, dated Nov. 14, 2011, pp. 1-4, European Patent Application No. 08781931.4, European Patent Office, Germany.
Marias, G.F. et al, SIP Vulnerabilities and Anti-SPIT Mechanisms Assessment, Aug 16, 2007, pp. 597-604, IEEE.
Jennings, C. et al., Verification Involving PSTN Reachability: Requirements and Architecture Overview, draft-jennings-vipr-overview-00, dated Apr. 1, 2011, pp. 1-42, IETF, http://tools.ietf.org/html/draft-jennings-vipr-overview-00.
Office Action, dated Jan. 5, 2012, pp. 1-41, U.S. Appl. No. 12/367,930, U.S. Patent and Trademark Office, Virginia.
Notice of Allowance, dated May 25 2012, pp. 1-13, U.S. Appl. No. 12/495,595, U.S. Patent and Trademark Office, Virginia.

* cited by examiner

| | |
|---|---|
| Ticket Identifier | 202 |
| Version | 204 |
| Encryption Algorithm Identifier | 206 |
| Salt | 208 |
| Initialization Vector | 210 |
| Encrypted Message | 224 |
|   Period of Validity — 212 | |
|   Set of Phone Number Ranges — 214 | |
|   Service Identifiers — 216 | |
|   Granter 218 / Epoch 221 | |
|   Grantee — 220 | |
| Message Authentication Code | 222 |

PREVENTION OF VOICE OVER IP SPAM

PRIORITY CLAIM

This application is a continuation application of, and claims priority under 35 U.S.C. §120 to, U.S. patent application Ser. No. 12/370,384, "PREVENTION OF VOICE OVER INTERNET PROTOCOL SPAM" filed Feb. 12, 2009, the entire contents of which are incorporated by reference.

TECHNICAL FIELD

The present disclosure relates generally to Internet Protocol Telephony.

BACKGROUND

Voice over Internet Protocol (VoIP) is widely used within enterprise networks and within service provider networks. However, use of VoIP between businesses on separate enterprise networks is less common. One reason for this is that if a business were to accept incoming VoIP requests from any enterprise, the business may be subject to VoIP spam. VoIP spam includes unsolicited or undesired bulk electronic messages sent using one or more VoIP protocols.

BRIEF DESCRIPTION OF THE DRAWINGS

The components and the figures are not necessarily to scale, emphasis instead being placed upon illustrating the principles of the invention. Moreover, in the figures, like-referenced numerals designate corresponding parts throughout the different views.

FIG. 2 illustrates a format of the ticket in one embodiment of the system to prevent VoIP spam.

DESCRIPTION OF EXAMPLE EMBODIMENTS

Overview

By way of introduction, the example embodiments described below include a system, logic encoded in a computer readable media, and a method to prevent VoIP spam.

According to a first aspect, a system to prevent VoIP spam may include a processor and a memory, with computer code in the memory. The system may store call data that is associated with a call, where the call is made to a phone number over a Public Switched Telephone Network (PSTN). The system may accept an Internet Protocol (IP) telephony connection from an IP telephony client in response to verification based on the call data that the IP telephony client is in possession of a demonstrated knowledge of the call made over the PSTN.

In a second aspect, logic is encoded in one or more tangible media for execution. The logic, when executed, may initiate a call to a phone number over a Public Switched Telephone Network (PSTN). The logic may also determine a destination address for the phone number. The logic may transmit at least one message to the destination address in order to demonstrate knowledge of the call to a device at the destination address.

In a third aspect, a method is provided. A call to a phone number over a Public Switched Telephone Network may be accepted. An Internet Protocol (IP) telephony connection to the phone number from an IP telephony client may be accepted in response to verifying the IP telephony client is in possession of a demonstrated knowledge of the call.

The present invention is defined by the following claims, and nothing in this section should be taken as a limitation on those claims. Further aspects and advantages of the invention are discussed below in conjunction with the example embodiments.

Example Embodiments

In one embodiment, a system to prevent VoIP spam may include a VoIP server such as Cisco® Unified Communications Manager from Cisco Technologies, Inc. of San Jose, Calif. The VoIP server may be in communication with a Public Switched Telephone Network (PSTN). The VoIP server may be reachable at a phone number over the PSTN. During operation, the VoIP server may follow a rule whereby the VoIP server may accept a VoIP call, which is directed to the phone number, from a VoIP client as long as the VoIP client, or another VoIP client from the same organization, had previously called the phone number over the PSTN.

By following this rule, the VoIP server may prevent VoIP spam. A spammer, in order to initiate a VoIP call to the VoIP server, would have to call the phone number over the PSTN first. Having to call the phone number over the PSTN forces the spammer to incur any costs associated with making the PSTN call and subjects the spammer to PSTN do-not-call lists and other regulations. Spam is possible when sending spam is inexpensive. The rule imparts an automatic cost to sending spam.

Figure 1:
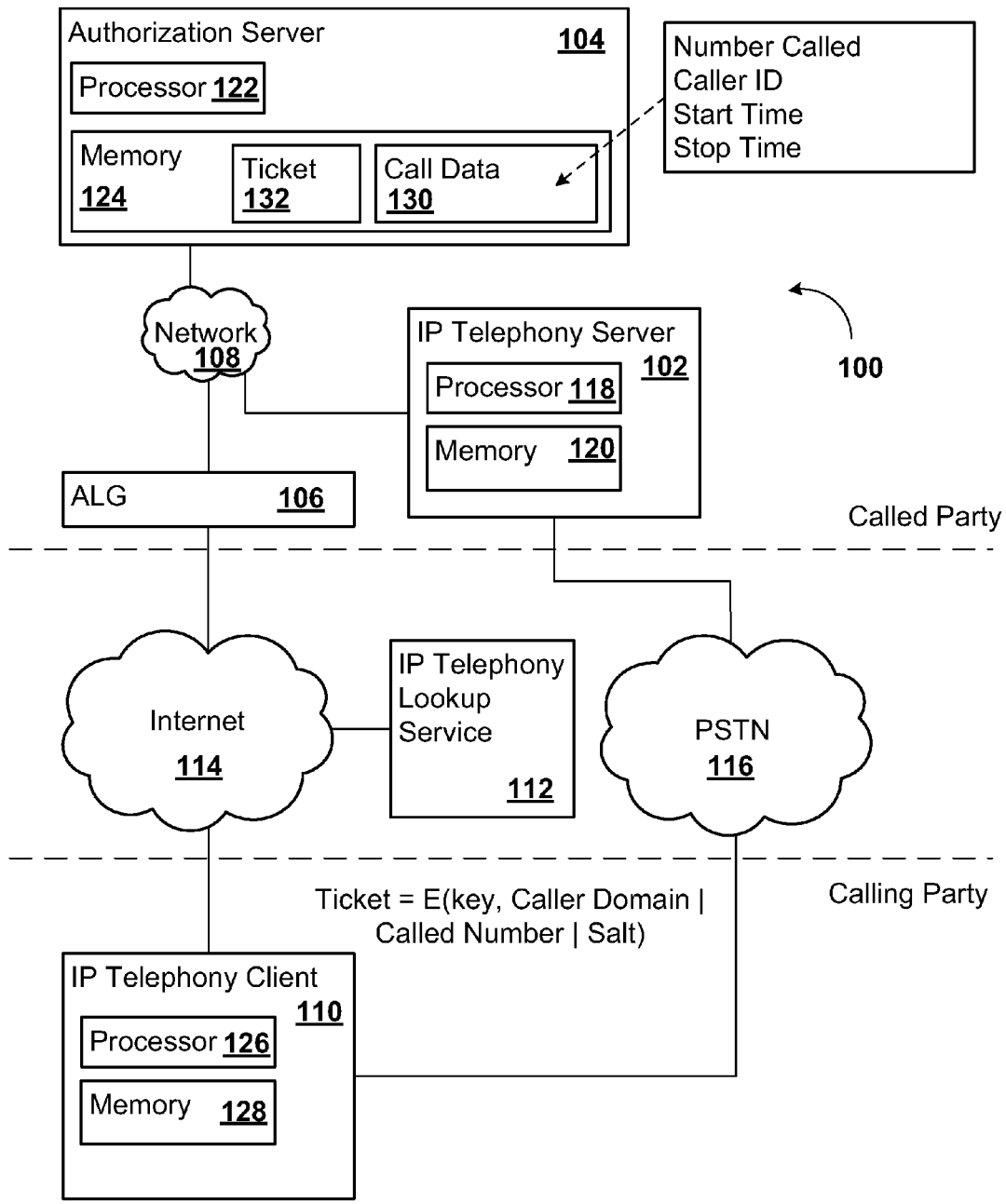
FIG. 1 illustrates one embodiment of a system to prevent VoIP spam.

FIG. 1 illustrates one embodiment of a system 100 to prevent VoIP spam. The system may include an IP telephony server 102, an authorization server 104, an application layer gateway 106, and a network 108.

The system 100 may include additional, different, or fewer components. For example, the system 100 may not include an application layer gateway 106. In another example, the IP telephony server 102 and the authorization server 104 may be included in the same device. In still another example, the system 100 may include multiple authorization servers 104. In yet another example, the system 100 may include multiple IP telephony servers 102. Alternatively or additionally, the system 100 may include one or more IP telephony clients 110 and/or an IP telephony lookup service 112. In still another example, the authorization server 104 and the IP telephony lookup service 112 may be the same device.

The IP telephony server 102 may be any device or combination of devices capable of accepting IP telephony connection requests. An IP telephony connection may be any voice over data connection or instant messaging connection. A voice over data connection may be any connection that transmits an audio, a visual, or an audiovisual signal over a network designed to exchange data. Examples of the voice over data connection include a VoIP connection and a voice connection established with Jabber. Jabber includes instant messaging technology and provides a set of standards for real-time communications. The IP telephony connection may be a connection based on a VoIP protocol, such as Session Initiation Protocol (SIP), Inter-Asterisk eXchange, H.323, Skinny Client Control Protocol (SCCP) or GoogleTalk. The Cisco® Unified Communications Manager is one example of the IP telephony server 102.

The authorization server 104 may be any device or combination of devices that determines whether a request to create the IP telephony connection is authorized based on one or more determined rules. In one example, the authorization server 104 may be in communication with the IP telephony server 102 over the network 108. The network 108 may be a Local Area Network (LAN), a Wireless Local Area Network (WLAN), a Personal Area Network (PAN), a Wide Area Network (WAN), or any other now known or later developed communications network. Additionally or alternatively, the authorization server 104 may be in communication with the application layer gateway (ALG) 106 over the network 108.

The ALG 106 may be any device or combination of devices that provides application level security to augment a firewall or Network Address Translator (NAT). For example, the ALG 106 may prevent an unauthorized request to create the IP telephony connection from entering the network 108. The ALG 106 may also be in communication with the Internet 114 or with some other untrusted network.

The IP telephony Client 110 may be in communication with the Internet 114 or with some other untrusted network. The IP telephony Client 110 may be any device or combination of devices that may initiate creation of the IP telephony connection. For example, the IP telephony Client 110 may be a VoIP server, the Cisco® Unified Communications Manager, a hard phone, a soft phone, a mobile phone, a conference phone, a teleconferencing unit, a personal computer, a laptop, an application specific integrated circuit, or a combination thereof. The IP telephony client 110 may also initiate a call over the PSTN 116.

The IP telephony lookup service 112 is any device or combination of devices that may determine a destination address from a phone number, where the destination address is any identifier that may be used to initiate the IP telephony connection to a party associated with the phone number. For example, the destination address may include a network address, such as an IP address. The destination address may include protocol specific information such as "sip:", "http:", and "https:".

One example of the IP telephony lookup service 112 may include a a peer-to-peer network of nodes that maintain a registry of VoIP call routing information. A second example of the IP telephony lookup service 112 may include a system that supports the Telephone Number Mapping (ENUM) suite of protocols as described in Request For Comments (RFC) 3761. A third example of the IP telephony lookup service 112 may include a database maintained on one or more server computers.

The IP telephony server 102 may include a processor 118 and a memory 120. The authorization server 104 may also include a processor 122 and a memory 124. The IP telephony client 110 may also include a processor 126 and a memory 128. The memory 120, 124, and 128 may be any now known, or later discovered, data storage device. The memory 120, 124, and 128 may be a non-volatile and/or volatile memory, such as a random access memory (RAM), a read-only memory (ROM), an erasable programmable read-only memory (EPROM), or flash memory. The memory 120, 124, and 128 may include an optical, magnetic (hard-drive) or any other form of data storage device.

The processor 118, 122, 126 may be in communication with the memory 120, 124, and 128. The processor 118, 122, 126 may also be in communication with additional components, such as the network 108, the Internet 114, or the PSTN 116. The processor 118, 122, 126 may be a general processor, central processing unit, server, application specific integrated circuit (ASIC), digital signal processor, field programmable gate array (FPGA), digital circuit, analog circuit, or combinations thereof.

During operation, the IP telephony client 110 may initiate a call over the PSTN 116 to a phone number that is assigned to the IP telephony server 102. The IP telephony server 102 may be in communication with the PSTN 116 and, thus, be able to receive incoming PSTN calls. For example, the IP telephony server 102 may include an IP Private Branch Exchange (IP-PBX). If the call completes, the IP telephony server 102 may store call data 130 associated with the call in the memory 120 of the IP telephony server 102. Alternatively or additionally, the IP telephony server 102 may store the call data 130 in a database. In one example, the IP telephony server 102 may transmit the call data to the authorization server 104 and the authorization server 104 stores the call data 130.

The call data 130 may include any information associated with the call or received during the call. For example, the call data 130 may include the phone number, a start time of the call, an end time of the call, caller ID information, or any combination thereof. The call data 130 may also include information associated with multiple calls. The call data 130 may also include tones or signals, such as Dual-Tone Multi-Frequency (DTMF), transmitted during the call. The call data may also include information related to the speech exchanged during the call, such as information derived from a speech compression algorithm, or information on talkspurts and silence periods during the call.

The authorization server 104 may enforce a rule where the authorization server 104 authorizes the IP telephony connection to the IP telephony server 102 from the IP telephony client 110 for a call to a number as long as the IP telephony client 110, or another IP telephony client within the same organization, had previously called the phone number over the PSTN 116. In order to enforce the rule, the authorization server 104 may communicate with the IP telephony client 110 to determine whether the IP telephony client 110 can provide a demonstrated knowledge of the call.

The demonstrated knowledge of the call may be information that indicates a possessor of the information knows of the call. For example, the demonstrated knowledge may include all or a portion of the call data 130, such as the end time of the call. In one example, the demonstrated knowledge may include a value determined based on all or a portion of the call data 130, such as a hash of a concatenation of the start time of the call and the end time of the call. In other examples, the demonstrated knowledge may include the union of the start times and end times of a set of calls made from the IP telephony client 110 to the IP telephony server 102 over the PSTN 116. In still other examples, the demonstrated knowledge may be considered a shared secret between the authorization server 104 and the IP telephony client 110. In such examples, the IP telephony client 110 may demonstrate knowledge of the call using a shared-secret based protocol. A shared-secret based protocol may be any protocol enabling secure communication between two devices based a demonstration of knowledge of a shared secret. A shared-secret protocol may be shared prior to the communication or by using a key-agreement protocol. Thus, when a shared-secret based protocol is used to demonstrate knowledge of the call, the call data 130 and/or the demonstrated knowledge may not be sent between the two devices during the establishment of the secure communication pre-shared key protocols. An example of a shared-secret based protocol includes a Secure Remote Password (SRP) protocol, such as the Transport Layer Security (TLS) SRP protocol.

The authorization server 104 may communicate with the IP telephony client 110 using one or more mechanisms. In one example, the IP telephony client 110 may determine the destination address of the IP telephony server 102 using the IP telephony lookup service 112. The IP telephony client 110, after completing the call over the PSTN 116, may transmit to the authorization server 104 a request for authorization to create a new IP telephony connection at a later time. As part of the request, the IP telephony client 110 may demonstrate to the authorization server 104 that the IP telephony client 110 has knowledge of the call data 130 using any suitable mechanism. For example, one way is to treat the call data 130 as a shared secret, and use a shared secret login protocol, such as the Secure Remote Password (SRP) protocol. Alternatively or additionally, the IP telephony client 110 may transmit the call data 130 to the authorization server 104 using any suitable protocol, including Hypertext Transport Protocol (HTTP), SIP, or any other protocol which can transmit information from a client to a server. The authorization server 104 may verify that the demonstrated knowledge of the call matches the call data 130 previously stored by the authorization server 104. If the authorization server 104 finds a match, then the authorization server 104 may authorize receipt of the request to create the IP telephony connection.

In a second example, the authorization server 104 may determine the phone number of a calling party from caller ID information included in the call data 130. The authorization server 104 may query the IP telephony lookup service 112 to find the destination address associated with the phone number of the calling party. The authorization server 104 may transmit a request to demonstrate knowledge of the call data 130 to the IP telephony client 110. The IP telephony client 110 may receive the request at the destination address. For example, the IP telephony client 110 may receive a Secure Hypertext Transfer Protocol (HTTPS) request or a request over Transport Layer Security (TLS) from the authorization server 104. The IP telephony client 110 may demonstrate to the authorization server 104 that the IP telephony client 110 has knowledge of the call data 130 using any suitable mechanism.

In one example, the authorization server 104 or the IP telephony client 110 may transmit the request to demonstrate knowledge of the call data 130 or the request for authorization to create the new IP telephony connection at a later time after the passage of a random amount of time since the call over the PSTN 116 was made. For example, the random amount of time may be anytime within a day of the call. The random passage of time may effectively prevent the IP telephony client 110 or the authorization server 104 from guessing start times or end times based on how quickly after the call the request to demonstrate knowledge or the request for authorization occurs.

After verifying that the demonstrated knowledge matches the call data 120, the authorization server 104 may generate a ticket 132. The ticket 132 may include information that indicates what permissions are granted to the holder of the ticket and/or information about who is permitted to hold the ticket. In one example, the ticket 132 may include a reference to such information, which is stored in the memory 124 of the authorization server 104 or in a database. Alternatively, the ticket 132 may contain the information instead of a reference to such information. The information in the ticket, or stored by authorization server 104 and associated with the ticket 132, may include the phone number of the called party that may be called with the ticket 132. The information may also include the Domain Name System (DNS) domain which may utilize the ticket. The authorization server 104 may transmit the ticket 132 to the IP telephony client 110 in response to receipt of proof of knowledge of the call data 130 from the IP telephony client 110.

After receiving the ticket 132, the IP telephony client 110 may store the ticket 132, the destination address of the IP telephony server 102, and the phone number called over the PSTN 116. The IP telephony client 110 may now transmit the ticket 132 to the IP telephony server 102 when initiating a request to create the IP telephony connection to the IP telephony server 102, possibly through ALG 106. For example, the IP telephony client 110 may include the ticket 132 in a header field, such as an X-Cisco-Passkey field, of a Session Initiation Protocol (SIP) invite request.

If the IP telephony client 110 is to call the phone number, the IP telephony client 110 may initiate a call using the IP telephony connection and transmit the ticket to the IP telephony server 102. If the IP telephony client 110 has not yet received the ticket 132, the IP telephony client 110 may initiate the call over the PSTN 116.

The ticket 132 may be generated using any number of mechanisms. In one example, the authorization server 104 may generate the ticket 132 using an encryption function. For example, the ticket 132 may be generated as the following encryption function: ticket=E(key, calling domain |called phone number|salt). In this example, the authorization server 104 encrypts the concatenation of the calling domain, the called phone number, and the salt using the key. The key may be a piece of information that determines the functional output of a cryptographic algorithm, where the piece of information is known to the authorization server 104, such as a symmetric key or an asymmetric key. The calling domain may be the Domain Name System (DNS) name of the organization of the IP telephony client 110. The called phone number may be the phone number called over the PSTN 116. The salt may be a random number.

When the IP telephony server 102 receives the ticket 132 in the IP telephony connection request from the IP telephony client 110, the IP telephony server 102 may transmit the ticket 132 to the authorization server 104 to authorize the IP telephony connection. Using the key, the authorization server 104 may decrypt the ticket 132 and extract an extracted called phone number and an extracted calling domain. In one example, the authorization server 104 may verify that the extracted called phone number and the extracted calling domain respectively match the phone number and destination address of the called party from the IP telephony signaling. Alternatively or additionally, the authorization server 104 may verify that the extracted calling domain matches the destination address of the IP telephony client 110 requesting the IP telephony connection. For example, the authorization server 104 may verify that the extracted calling domain matches the domain name of the IP telephony client 110 provided when creating a Transport Layer Security (TLS) connection between the IP telephony client 110 and the IP telephony server 102. In the match fails, the authorization server 104 may indicate that the IP telephony connection is unauthorized. If the match succeeds, the authorization server 104 may indicate that the IP telephony connection is authorized.

Alternatively, instead of transmitting the ticket 132 to the authorization server 104, the IP telephony server 102 may have access to the key used to create the ticket 132, and may therefore be able to extract the information from the ticket 132 and perform the authorization checks itself.

Alternatively, the ALG 106, upon receiving the IP telephony connection request en-route to the IP telephony server 102, may have access to the key used to create the ticket 132, and may therefore be able to extract the information from the ticket and perform the checks itself.

In a different example, the called phone number encrypted in the ticket 132 may be a range of phone numbers that is assigned to the IP telephony server 102 instead of just the phone number originally called over the PSTN 116. As in the previous example, the authorization server 104, IP telephony server 102, or ALG 106 may decrypt the ticket 132 using the key to extract the extracted called phone number. The authorization server 104, IP telephony server 102, or ALG 106 may verify that the extracted called phone number matches the range of phone numbers that is assigned to the IP telephony server 102. Thus, when the called phone number encrypted in the ticket 132 is the range of phone numbers, the IP telephony client 110 may connect to the destination addresses associated with one or more phone numbers in the range of phone numbers. This lowers the cost of connecting to such destination addresses. Lowering the cost of connecting to such destination addresses benefits legitimate calling parties, but decreases the barriers to VoIP spam.

In one example, the authorization server 104 may include an authorization server identifier in the ticket 132. The authorization server identifier may be any identifier that distinguishes the authorization server 104 from among two or more authorization servers 104. The authorization server identifier may be unencrypted in the ticket 132. As discussed above, the ALG 106 may prevent an unauthorized request to create the IP telephony connection from entering the network 108. The ALG 106 may determine the authorization server identifier from the ticket 132 included in the request to create the IP telephony connection. The ALG 106 may use the authorization server 104 identified by the authorization server identifier to authenticate the incoming IP telephony connection before permitting the request to create the IP telephony connection to enter the network 108. In another example, the ALG 106 may use the key to decrypt and authenticate the incoming IP telephony connection.

Matching the demonstrated knowledge with the call data 120 may include comparing time data generated by a first clock included in the IP telephony server 102 with time data generated by a second clock included in the IP telephony client 110. Discrepancies between the first clock and the second clock may prevent a proper match. To avoid a match failure due to these discrepancies, the first clock and the second clock may be synchronized using, for example, a common time server. Additionally or alternatively, time data may be rounded to a predetermined precision or a tolerance may be used to overcome these discrepancies. In one example, the time data included in the demonstrated knowledge of the call may be a relative time calculated based on the time of the transmission of the demonstrated knowledge, where the relative time is determined from a difference in two clock values, both obtained from the first clock. The authorization server 104 may convert the relative time to an absolute time based on the receipt time of the demonstrated knowledge according to the second clock. The absolute time may differ from the time stored by the authorization server 104 by the delay incurred in transmitting the demonstrated knowledge over the Internet 114 and the network 108.

Alternatively, the demonstrated knowledge of the call may be provided by a database or other memory store independent of the IP telephony client 110. For example, the authorization server 104 may establish a trust relationship with the database. The IP telephony client 110 may also establish a trust relationship with the database. In one example, the trust relationships may be based on certificates issued from a common certificate authority. The IP telephony client 110 may transmit the call data 130 to the database. The network address of the IP telephony client 110 may be stored in the database. The IP telephony client 110 may initiate the creation of the IP telephony connection over TLS. The authorization server 104 may verify that the network address of sent as part of the TLS is associated with the call data 130 in the database. In this manner, the IP telephony client 110 may create the IP telephony connection with the IP telephony server 102 without transmitting the call data 130 or the ticket 132 to the IP telephony server 102 or authorization server 104.

FIG. 2 illustrates a format of the ticket 132 in one embodiment of the system 100 to prevent VoIP spam. The ticket 132 may include one or more fields 202, 204, 206, 208, 210, 212, 214, 216, 218, 220, 221 and 222. One or more of the fields 212, 214, 216, 218, 220 and 221, may be included in an encrypted message 224 that is included in the ticket 132. For example, the ticket 132 may include a ticket identifier 202, a version 204, an encryption algorithm identifier 206, salt 208, an initialization vector 210, a period of validity 212, a set of phone number ranges 214, one or more service identifiers 216, a granter 218, a grantee 220, an epoch 221, and a message authentication code 222. The ticket 132 may include additional, different, or fewer fields. The encrypted message 224 may include, for example, the period of validity 212, the set of phone number ranges 214, the service identifiers 216, the granter 218, the grantee 220, and the epoch 221.

The ticket identifier 202 may uniquely identify the ticket 132. For example, the ticket identifier 202 may be a universally unique identifier (UUID) that is 128 bits long. The version 204 may identify an implementation version so that the mechanism used to generate the ticket 132 may be changed in the future. For example, the version 204 may be "1" in an initial implementation. The encryption algorithm identifier 206 may describe the encryption algorithm used to encrypt or decrypt the encrypted message 224 of the ticket 132. Alternatively or in addition, the encryption algorithm identifier 206 may also identify the encryption algorithm used to generate the message authentication code 222. For example, the encryption algorithm identifier 206 may be "AES-128-CBC-HMAC-SHA1."

The salt 208 may be a random number. For example, the salt 208 may be a 32-bit integer. The initialization vector 210 is a block of bits that may allow a stream cipher or a block cipher to be executed in any of several streaming modes of operation to produce a unique stream independent from other streams produced by the same encryption key. For example, the initialization vector 210 may be a 128-bit block used in cipher-block chaining (CBC) mode to encrypt the encrypted message 224. The initialization vector 210 may be unique to each respective one of the tickets 132 generated.

The period of validity 212 provides an indication of the period of time during which the ticket 132 is valid. The ticket 132 is valid if the authorization server 104 would verify the ticket 132 as valid. For example, the period of validity 212 may include a time at which the ticket 132 ceases to be valid. Additionally or alternatively, the period of validity may include a time at which the ticket 132 is first valid. In a different example, the period of validity 212 includes a time of issue and a duration value, where the duration value indicates the length of time from the time of issue of the ticket 132 during which the ticket 132 is valid.

The set of phone number ranges 214 may identify one or more phone numbers that are assigned to the IP telephony server 102. Additionally or alternatively, the set of phone number ranges 214 may identify one or more phone numbers for which the ticket 132 is valid.

The service identifiers 216 may identify one or more services for which the ticket 132 is valid. For example, the service identifier 216 may indicate that a VoIP call may be accepted with the ticket 132. Additionally or alternatively, the service identifier 216 may indicate that an instant message session may be accepted with the ticket 132.

The granter 218 may identify the authorization server 104 that issued the ticket 132. Additionally or alternatively, the granter 218 may identify an entity in charge of one or more authorization servers 104, such as a company.

The grantee 220 may identify the IP telephony client 110 to which the ticket 132 was granted. For example, the grantee 220 may be the caller domain.

The epoch 221 may be a generation counter for keying material. The keying material may be any information related to the key used in encryption. When the keying material changes, then the epoch 221 may be increased by a determined value, such as one. The IP telephony client 110 may determine from the epoch 221 which set of keying material to use.

The message authentication code (MAC) 222 may be a piece of information used to verify the integrity of a message. A MAC algorithm accepts as input a secret key and an arbitrary-length message to be integrity-checked, and outputs a MAC 222. For example, the message may be the bits included in the ticket 132 except for the bits comprising the MAC 222. The MAC 222 protects both the data integrity and the authenticity of the message, by allowing verifiers in possession of the secret key to detect any changes to the message content. The secret key may be a MAC key, which is described later. In one example, the MAC 222 may be calculated using a keyed-Hash Message Authentication Code Secure Hash Algorithm (HMAC-SHA1).

During operation, the authorization server 104 may use two keys to generate the ticket 132: a message key and a MAC key. The authorization server 104 may use the message key to generate the encrypted message 224 with the encryption algorithm identified in the encryption algorithm identifier 206. The authorization server 104 may use the MAC key to generate the MAC 222 with the encryption algorithm identified in the encryption algorithm identifier 206. For example, the authorization server 104 may encrypt the encrypted message 224 using the Advanced Encryption Standard (AES) and a 128-bit fixed block size in cipher-block chaining (CBC) mode with the message key. In the same example, the authorization server 104 may determine the MAC 222 by computing the HMAC-SHA1 of the rest of the ticket 132 with the MAC key. The encryption algorithm identifier 206 in this example may be "AES-128-CBC-HMAC-SHA1."

The message key and the MAC key may be generated using a key strengthening technique. For example, the two keys may be generated using a Password-Based Key Derivation Function (PBKDF2). PBKDF2 is a key derivation function that is part of the Public-Key Cryptography Standards (PKCS) series, such as PKCS #5 v2.0. PBKDF2 applies a pseudorandom function, such as a cryptographic hash, cipher, or keyed-Hash Message Authentication Code (HMAC) to an input password or passphrase along with a salt value and repeats the process many times to produce a derived key, which can then be used as a cryptographic key in subsequent operations.

In one example, the message key may be generated as the function HMAC-SHA1(P, S|Int(1)) and the MAC key may be generated as the function Trunc128(HMAC-SHA1(P, S|Int (2))). S may be the salt 208. Int(x) is a 32-bit integer form of x. P is a password without null termination. Trunc128(x) is the first eight bytes of x. The password may be configured by an administrator. The same password may be used for the generated tickets. Periodically, the administrator may change the password and subsequent tickets may be generated with the new password. When the password is changed, the epoch 221 may be incremented. For each one of the tickets generated, a different value of the salt 208 may be used.

In another embodiment, the ticket 132 may include a message integrity check and include no encrypted data.

The ticket 132 may expire. In one example, the authorization server 104 may transmit a new ticket 132 to the IP telephony client 110 prior to the older ticket 132 expiring. In another example, the IP telephony client 110 may request the new ticket 132 prior to the older ticket 132 expiring. The IP telephony client 110 may use the most recently received ticket 132 to initiate the IP telephony connection.

For example, the IP telephony client 110 may include the call data 130 of the original call in a request for the new ticket 132, such as by including the call data 130 in an HTTPS request transmitted to the authorization server 104. In a second example, the authorization server 104 may transmit a request for the call data of the original call in a HTTPS request. In a third example, the IP telephony client 110 may include the call data 130 of the original call in a request for the new ticket 132 sent over TLS. In a forth example, the IP telephony client 110 may make an additional call over the PSTN 116 if the ticket 132 is about to expire in order to get the new ticket 132.

In one example, the authorization server 104 may issue the new ticket 132 without the IP telephony client 110 initiating an additional call over the PSTN 116. Additionally or alternatively, the authorization server 104 may issue the new ticket 132 only after the IP telephony client 110 makes an additional call over the PSTN 116.

If the ticket 132 transmitted by the IP telephony client 110 is rejected by the authorization server 104, the IP telephony client 110 may request the new ticket 132. The ticket 132 may be rejected for one or more reasons, such as the ticket 132 expired or the password changed from when the ticket 132 was issued.

The ticket 132 may be specially encoded for transmission in an IP telephony connection. For example, the ticket 132 may be base 64 encoded for inclusion within a SIP header.

Figure 3:
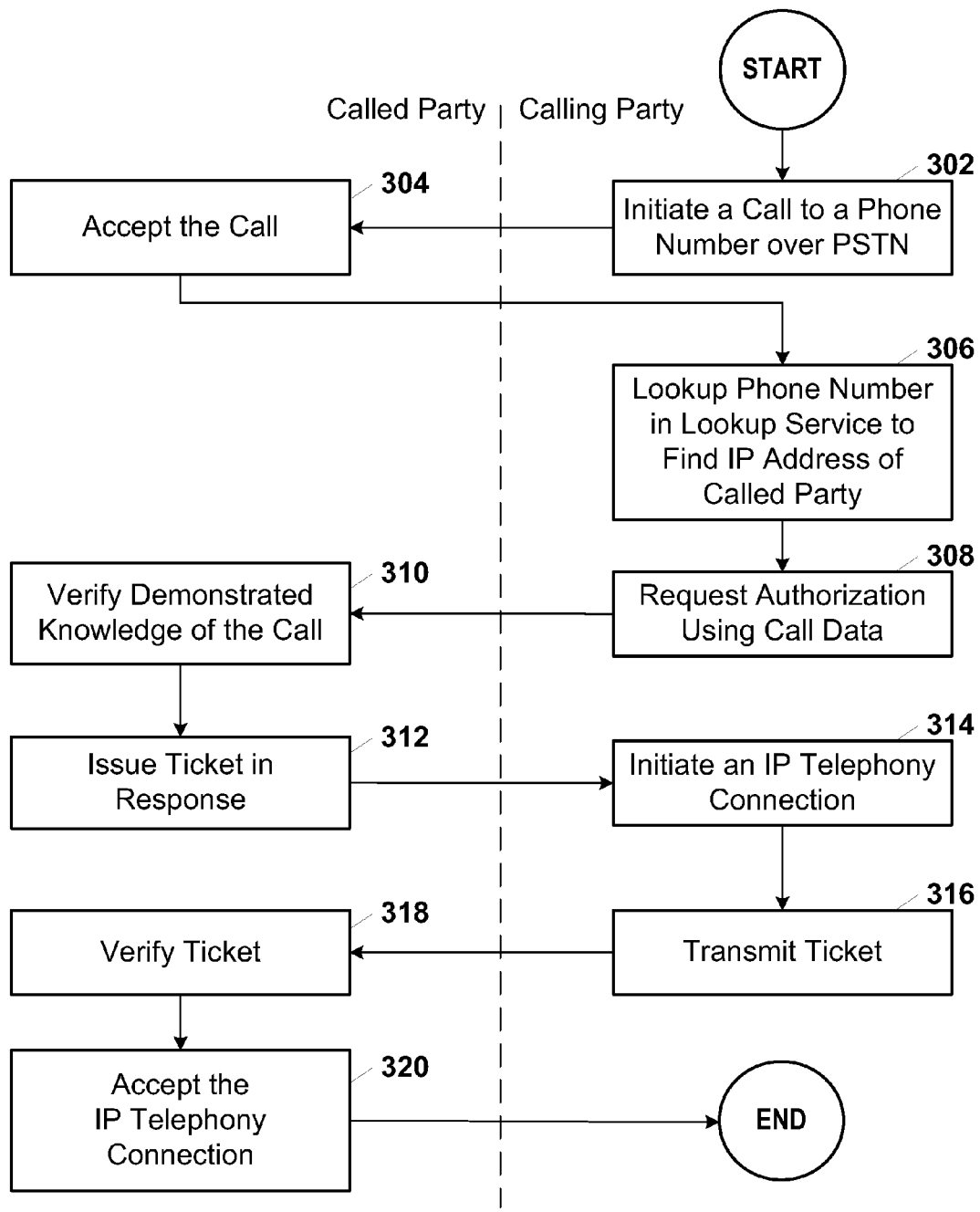
FIG. 3 illustrates one embodiment of a method to prevent VoIP spam.

FIG. 3 illustrates one embodiment of a method to prevent VoIP spam. Additional, different, or fewer acts may be performed. The acts may be performed in a different order than illustrated in FIG. 3.

In act 302 of the embodiment illustrated in FIG. 3, the operation may begin by initiating the call to the phone number over the PSTN 116. The operation may continue in act 304 by accepting the call.

A random amount of time after the call was accepted and/or completed, the operation may continue in act 306 by looking up the address of the IP telephony server 102 using the phone number. The operation may continue in act 308 by requesting authorization from the authorization server 104 to make a subsequent call over a new IP telephony connection.

In act 310, the operation may include verifying the IP telephony client 110 has the demonstrated knowledge of the call. The operation may continue in act 312 by issuing the ticket 132 in response to successfully verifying the demonstrated knowledge of the call.

In act 314, the operation may continue immediately, and/or later when a call is to be made, by transmitting the request to create the IP telephony connection. In act 316, the operation may include transmitting the ticket 132.

In act 318, the operation may include verifying the validity of the ticket 132. In act 320 of the one embodiment, the operation may conclude by accepting the IP telephony connection in response to verification that the request to create the IP telephony connection includes the verified ticket 132.

Different components provide different functions for implementing the functionality of the various embodiments. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system. Logic encoded in one or more tangible media for execution is defined as instructions that are executable by the processor and that are provided on the computer-readable storage media, memories, or a combination thereof.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A system comprising:
    a memory; and
    a processor in communication with the memory, the memory including computer code executable with the processor, wherein the computer code is executable to:
    initiate a first call to a phone number over a Public Switched Telephone Network (PSTN);
    determine a destination address for the phone number;
    transmit at least one message to the destination address for a second call in order to demonstrate knowledge of the first call to a device at the destination address; and
    receive a ticket in response to transmission of the at least one message.

2. The system of claim 1, wherein the computer code is further executable to:
    use call data associated with the first call to demonstrate the knowledge of the first call to the device;
    receive the ticket from the device in response to successful demonstration of knowledge of the first call; and
    include the ticket in a request to create an Internet Protocol (IP) telephony connection for the second call.

3. The system of claim 1, wherein the ticket includes an indication of when the ticket expires.

4. The system of claim 1, wherein the knowledge of the call includes a start time of the first call.

5. The system of claim 1, wherein the knowledge of the call includes an end time of the second call.

6. The system of claim 1, wherein the knowledge of the call includes caller identification (caller ID) information transmitted as part of the first call.

7. Logic encoded in one or more tangible non-transitory media for execution by a processor and when executed operable to:
    store call data, wherein the call data is associated with a first call to a phone number over a Public Switched Telephone Network (PSTN);
    issue a ticket for a second call in response to a verification based on the call data that an Internet Protocol (IP) telephony client is in possession of a demonstrated knowledge of the first call made over the PSTN; and
    accept an Internet Protocol (IP) telephony connection for the second call from the IP telephony client in response to a validation of the ticket.

8. The one or more tangible media of claim 7, wherein the IP telephony connection is a Voice over Internet Protocol (VoIP) connection.

9. The one or more tangible media of claim 7, wherein the logic when executed is further executable to:
    verify the IP telephony client is in possession of the demonstrated knowledge of the first call made over the PSTN based on the call data; and
    transmit the ticket to the IP telephony client in response to the verification that the IP telephony client is in possession of the demonstrated knowledge of the first call made over the PSTN.

10. The one or more tangible media of claim 7, wherein the logic when executed is further executable to receive the ticket from the IP telephony client.

11. The one or more tangible media of claim 7, wherein the logic when executed is further executable to verify the IP telephony client is in possession of the demonstrated knowledge of the first call through a shared-secret based protocol, and the demonstrated knowledge of the first call made over the PSTN is a shared secret.

12. The one or more tangible media of claim 11, where the shared-secret based protocol is the Transport Layer Security (TLS) Secure Remote Password (SRP) protocol.

13. The one or more tangible media of claim 7, wherein the logic when executed is further executable to verify the IP telephony client is in possession of the demonstrated knowledge of the first call based on receipt of the demonstrated knowledge of the first call from the IP telephony client.

14. A method comprising:
    initiating a first call to a phone number over a Public Switched Telephone Network (PSTN) with a processor;
    transmitting a message over an IP (Internet Protocol) network to a device on the IP network, the message demonstrating knowledge of the first call; and
    receiving a ticket with the processor from the device in response to transmission of the message demonstrating knowledge of the first call, the ticket being authorization to establish an Internet Protocol (IP) telephony connection over the IP network for a second call to the phone number.

15. The method of claim 14 further comprising establishing the IP telephony connection with the processor when initiating the second call to the phone number.

16. The method of claim 15, wherein establishing the IP telephony connection comprises including the ticket in a request to create the IP telephony connection.

17. The method of claim 14, wherein transmitting the message over the IP network to the device on the IP network is in response to receiving a request from the device to demonstrate knowledge of the first call.

18. The method of claim 14, wherein the request from the device to demonstrate knowledge of the first call is received a random period of time after the first call is initiated.

19. The method of claim 14, wherein transmitting the message over the IP network to the device on the IP network comprises transmitting an authorization request to the device over the IP network.

20. The method of claim 14 further comprising initiating a third call to the phone number over the PSTN in response to a determination that the ticket is to expire within a determined time period.

* * * * *